(12) United States Patent
Potter

(10) Patent No.: US 6,269,827 B1
(45) Date of Patent: Aug. 7, 2001

(54) ELECTRICALLY OPERATED PRESSURE CONTROL VALVE

(75) Inventor: James C. Potter, Novi, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/414,282

(22) Filed: Oct. 7, 1999

(51) Int. Cl.⁷ .................................................. F15B 13/044
(52) U.S. Cl. .................. 137/14; 137/625.65; 251/129.08
(58) Field of Search ....................... 137/625.65, 14; 251/129.08

(56) References Cited

U.S. PATENT DOCUMENTS

| | | | |
|---|---|---|---|
| 4,678,006 | 7/1987 | Northman et al. | 137/596.17 |
| 4,947,893 | 8/1990 | Miller et al. | 137/625.65 |
| 5,261,637 | 11/1993 | Curnow | 251/129.15 |
| 5,513,673 | 5/1996 | Slavin et al. | 137/625.65 |
| 5,513,832 | 5/1996 | Becker et al. | 251/129.18 |
| 5,577,534 * | 11/1996 | Ward | 137/625.65 X |
| 5,853,028 | 12/1998 | Ness et al. | 137/625.65 |
| 5,855,229 | 1/1999 | Gluf | 137/884 |
| 5,894,860 * | 4/1999 | Baldauf et al. | 137/625.65 |

* cited by examiner

Primary Examiner—Gerald A. Michalsky
(74) Attorney, Agent, or Firm—Roger A. Johnston

(57) ABSTRACT

A variable force solenoid operated pressure control valve for controlling an hydraulically operated actuator in a fluid pressure circuit. The valve has a spool in a straight spool bore with fluid pressure chambers at opposite ends. One spool end has a rod press fitted therein with the rod extending through the fluid pressure chamber and operatively contacting the solenoid armature. The rod creates an area differential on the spool ends for providing an axial spool force proportional to the pressure in the fluid chambers which are each connected by a metering passage in the spool to a recess on the spool which is continuously connected to a control pressure port. A supply port is connected to the recess by a first valving land on the spool and an exhaust port is connected to the recess by a second valving land on the spool. The metering passages serve to attenuate transients.

8 Claims, 4 Drawing Sheets

ELECTRICALLY OPERATED PRESSURE CONTROL VALVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to an electrically operated variable force solenoid pressure control valve of the type which may be employed for use in automatic transmission controllers for controllably reducing a fluid inlet pressure to an outlet control pressure.

A known variable force solenoid pressure control valve has utilized a stepped diameter spool. The differential area between the stepped diameters is used to apply a known force proportional to the control or output pressure which known force can more readily be overcome by the solenoid to provide desired actuation of the spool.

Referring to FIG. 4, a known stepped diameter spool valve is shown with the solenoid omitted for the sake of brevity having an operating rod 1 connected to the solenoid armature which moves spool 2 having a large diameter valving land 3 movable in spool bore 4 with a reduced diameter valving land 5 movable in reduced diameter spool bore 6. Land 3 valves flow to exhaust port 7; whereas, land 5 valves flow from inlet port 8 to annular recess 9 which is continuously connected with the control pressure outlet port 13.

However, the manufacture of a valve having a stepped bore and stepped spool requires that extremely fine control of the concentricity between the stepped diameters be maintained. This results in very tight tolerances on the machining of the spool and the bore and therefore increases the cost of the valve resulting in a prohibitively expensive valve construction for high volume mass production motor vehicle automatic transmission usage. Therefore, it has been desired to provide a way or means of utilizing the differential area technique to control the force required to actuate the valve spool against the pressure forces of the hydraulic fluid and yet provide such a valve which is relatively easy to manufacture and which eliminates the need for control of concentricity between different diameters and unusually tight machining tolerances.

Furthermore, it has been desired to reduce the effective pressure transients during the operation of the valve in a hydraulic control system such as the shift control circuit of an automatic transmission in a manner which is cost effective. Heretofore, variable force solenoid valves have employed annular grooves in the valve spool bore to provide flow of fluid for balancing the pressure forces on the spool. However, it has proven costly to machine such grooves in the spool bore; and, therefore it has been desired to eliminate the need for such costly manufacturing operations and yet provide a way to enable the flow of fluid for balancing pressure forces on the spool.

BRIEF SUMMARY OF THE INVENTION

The present invention provides a variable force solenoid operated pressure control valve of the type wherein an electric signal to the solenoid is employed to provide a desired control pressure in a hydraulic control circuit to provide actuation of a hydraulically operated device such as, for example, a piston or diaphragm type actuator. The valve of the present invention is particularly suitable for use in electrically controlling the pressure in a shift control circuit for an automatic transmission of the type employed in passenger cars and light truck motor vehicles.

The valve of the present invention employs a straight valving bore with a valving spool slidably received therein for movement by a rod connected to a solenoid armature. The rod is rigidly attached to one end of the spool, preferably by press fit engagement, and extends outwardly of the spool bore in sealed arrangement for contacting the armature solenoid. The spool has fluid pressure chambers formed at opposite ends; and thus, the presence of the rod in the end of the spool creates a differential area for the spool ends resulting in a net force from the pressure forces acting on the spool ends.

The spool has a first land for valving flow from an inlet port to a recess or control pressure chamber and a second land disposed for valving flow to an exhaust port. The recess or control pressure chamber is continuously connected to a control pressure port disposed intermediate the supply and exhaust ports and is adapted for connection to the hydraulic control circuit of the device to be actuated. The control pressure chamber or recess is connected to the fluid chambers at the opposite ends of the spool by separate restrictive or metering passages formed in the spool. The restrictive passages provide attenuated flow to the pressure chambers on the ends of the spool to maintain the desired pressure force balance; however, the passages are effective to dampen transients and thus reduce oscillations of the spool.

The construction of the solenoid operated pressure control valve of the present invention employs a straight bore and spool construction which reduces manufacturing tolerances and cost and creates a differential pressure area on the spool ends by employing a rod press fitted into the end of the spool. The balance of pressure forces on the spool ends is controlled and attenuated by restrictive passages communicating with the chambers at the spool ends which passages are formed between the control pressure chamber and the spool end chambers exclusively by metering passages formed in the spool thereby eliminating the need for providing such passages in the spool bore.

The valve of the present invention thus provides improved valve performance by providing for attenuation of transients and maintaining pressure force balance on the spool yet provides a simplified construction and reduced manufacturing costs.

DETAILED DESCRIPTION OF THE INVENTION

Figure 1:
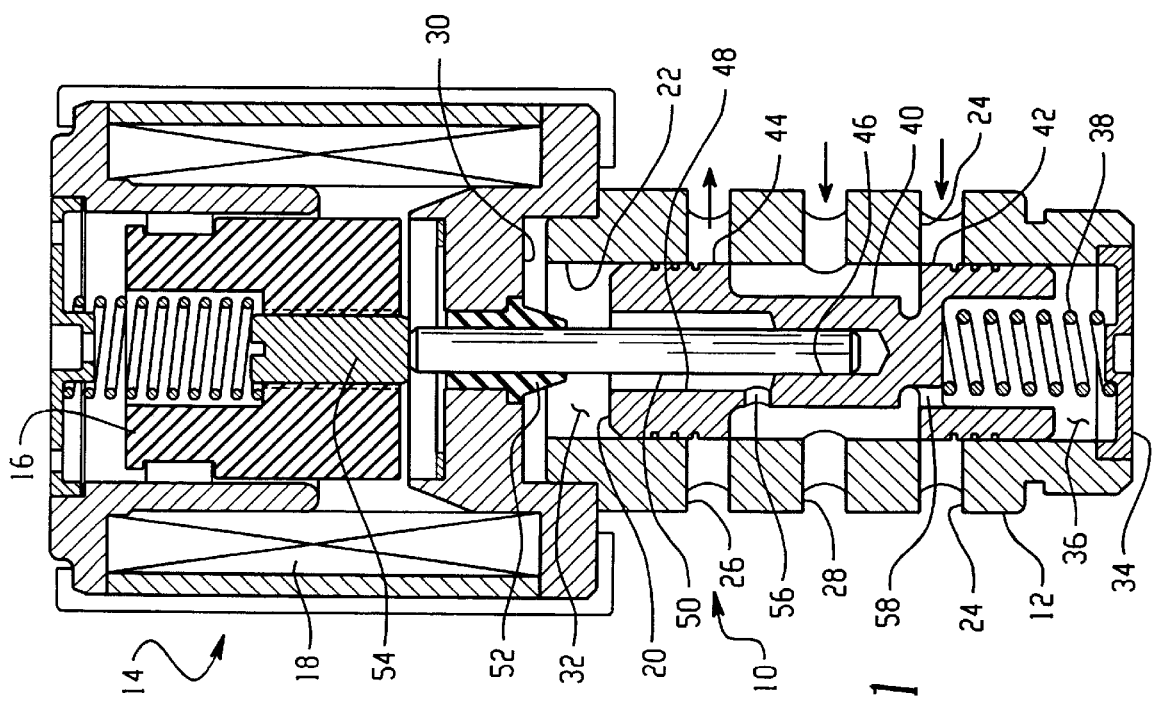
FIG. 1 is a cross section of the valve of the present invention shown with the spool in the flow control position with the solenoid energized.

Referring to FIG. 1, a valve of the present invention is indicated generally at 10 and has a valve body 12 having a uniform diameter for sealed engagement in a ported valving block (not shown) and a solenoid operator indicated generally at 14 which includes a movable solenoid 16 disposed for movement within coil 18.

The valving spool 20, having a generally straight cylindrical configuration on its outer periphery, is disposed in a straight valving spool bore 22 formed in the body 12. Body 12 has formed therein a supply pressure inlet port 24 which is disposed generally adjacent the lower end of valve body, with a sump or exhaust port 26 formed in the region of the upper end of the body 12 in axially spaced arrangement with port 26 and communicating with the spool bore 22. A pressure control outlet port 28 is disposed axially intermediate the supply and exhaust ports 24, 26; and, port 28 similarly communicates with the spool bore 22.

The upper end of the spool bore 22 is closed by the solenoid base 30 to form an upper spool-end fluid pressure chamber 32; and, the lower end of the spool bore is sealed by a plug 34 which forms a lower spool end fluid pressure chamber 36. A bias spring is provided in the chamber 36 for biasing spool 20 in an upward direction as denoted by reference number 38.

The spool 20 has a recess 40 formed in the outer periphery thereof which extends axially a distance sufficient to form a first valving land 42 on the lower end of the spool for valving flow through port 24; and, recess 40 forms at its upper end a second valving land 44 disposed for valving flow to the exhaust port 26.

A bore 46 and counter bore 48 are provided in the upper end of the spool 20. A rod or pin 50 has one end thereof press fitted into the bore 46 with the opposite or upper end of pin 50 extending through a seal 52 provided in the solenoid base 30. The upper end of the rod 50 extends upwardly for contact with an adjustment screw 54 provided in the armature 16. The rod 50 thus reduces the effective area of the upper end of the spool 20 upon which the fluid pressure in chamber 32 acts. This creates a differential with the cross sectional area of the lower end of the spool in chamber 36 and the upper end of the spool 32; thus, the pressure forces acting on the spool result in a net force in the upward direction.

The spool is shown in FIG. 1 in a position in which the solenoid has been energized to a desired current level; and, the land 44 is in a position permitting some flow to exhaust port 26 and land 42 is providing some flow from the pressure supply through inlet port 24 thereby maintaining a desired control pressure in the recess 40 and control pressure port 28.

A restrictive or metering passage 56 is formed in the spool to communicate the upper end of recess 40 with the counter bore 48 in the upper end of the spool which provides communication between control pressure recess 40 and the fluid pressure chamber 32 at the upper end of the spool.

Similarly, a second restrictive or metering passage 58 is provided in the lower end of the spool for communicating the lower end of recess 40 with the lower end of the spool and fluid chamber 36 thereby maintaining communication between control pressure port 28 and the fluid pressure chamber 36.

Figure 2:
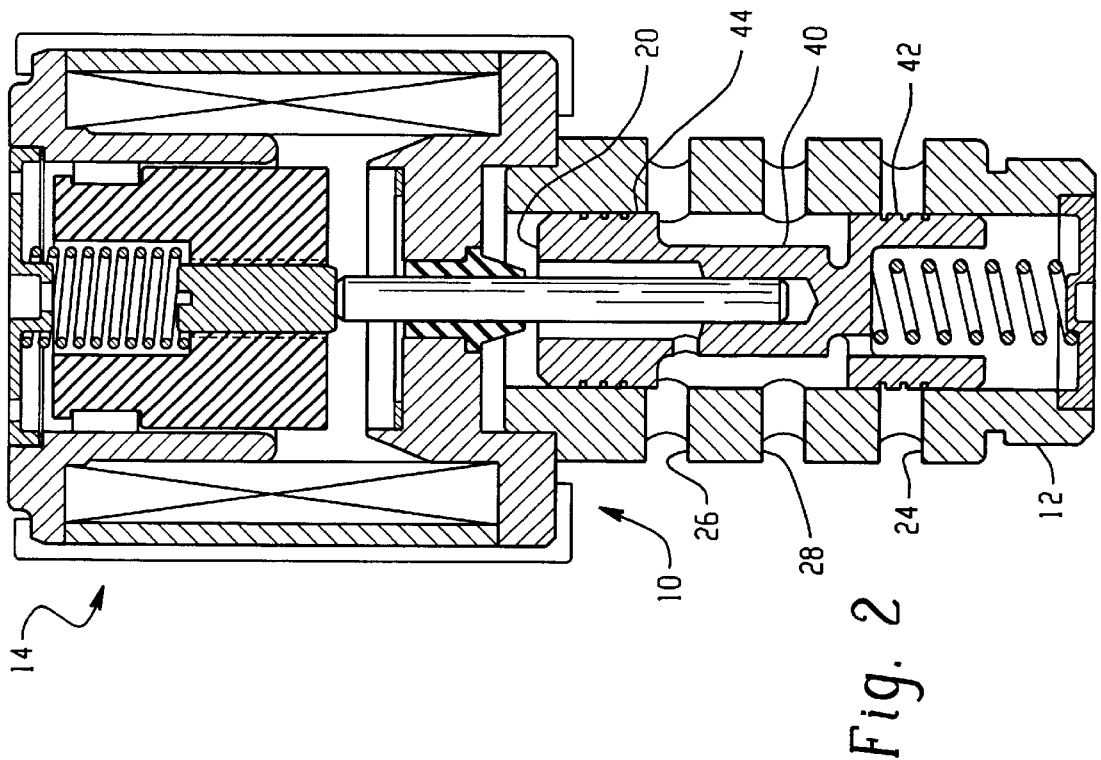
FIG. 2 is a view similar to FIG. 1 with the solenoid de-energized and the inlet port closed with the control pressure port fully opened to the exhaust.

Referring to FIG. 2, the valve of FIG. 1 is shown with the spool in the fully upward position as when the solenoid is de-energized, in which position land 42 closes supply port 24; and, land 44 provides full communication between the control pressure recess 40 and control port 28 with the exhaust port 26.

Figure 3:
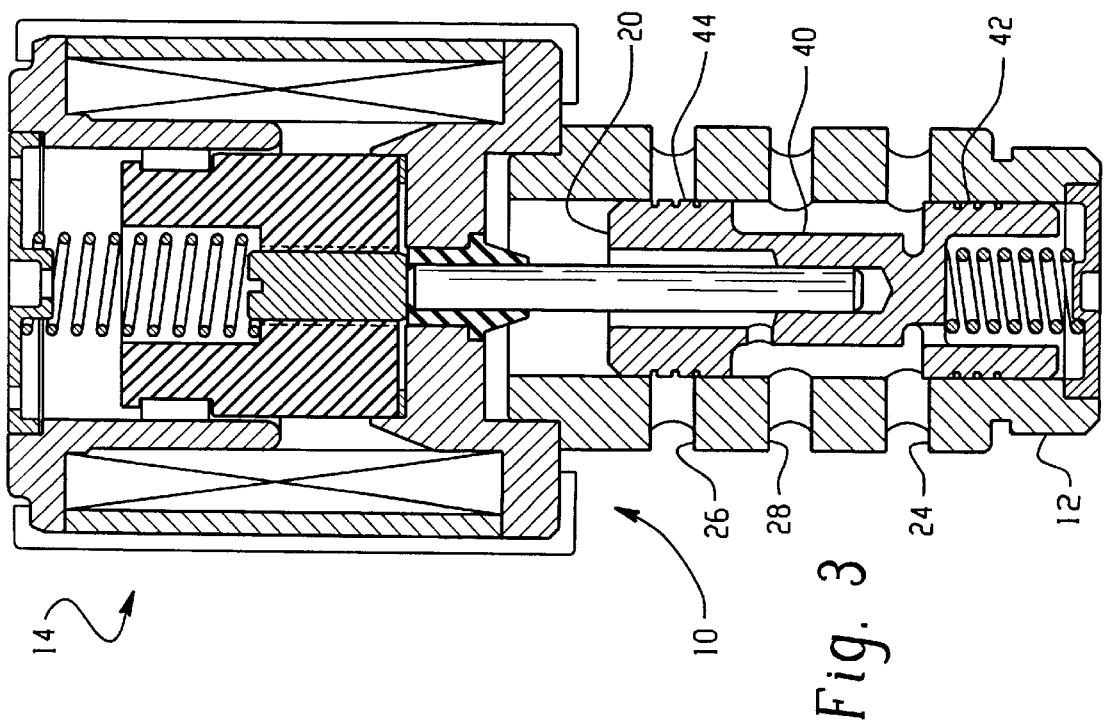
FIG. 3 is a view similar to FIG. 1 with the solenoid fully energized with the exhaust port closed and the control pressure port fully opened to the inlet supply pressure.

Referring to FIG. 3, the valve 10 is shown with the solenoid fully energized where upon armature has moved the spool to its downward limit position wherein land 44 has closed exhaust port 26; and, land 42 has provided full communication between the supply inlet port, recess 40 and control pressure outlet port 28.

Figure 4:
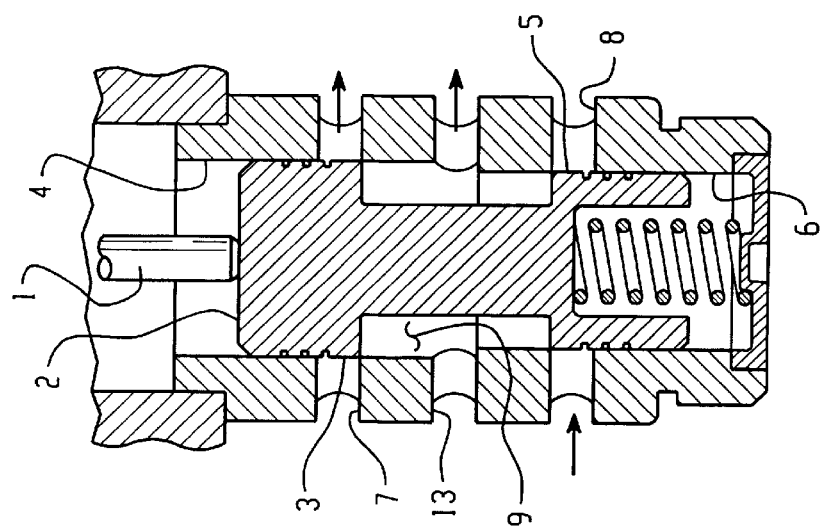
FIG. 4 is a cross section of the portion of a valve of a prior art construction.
Figure 5:
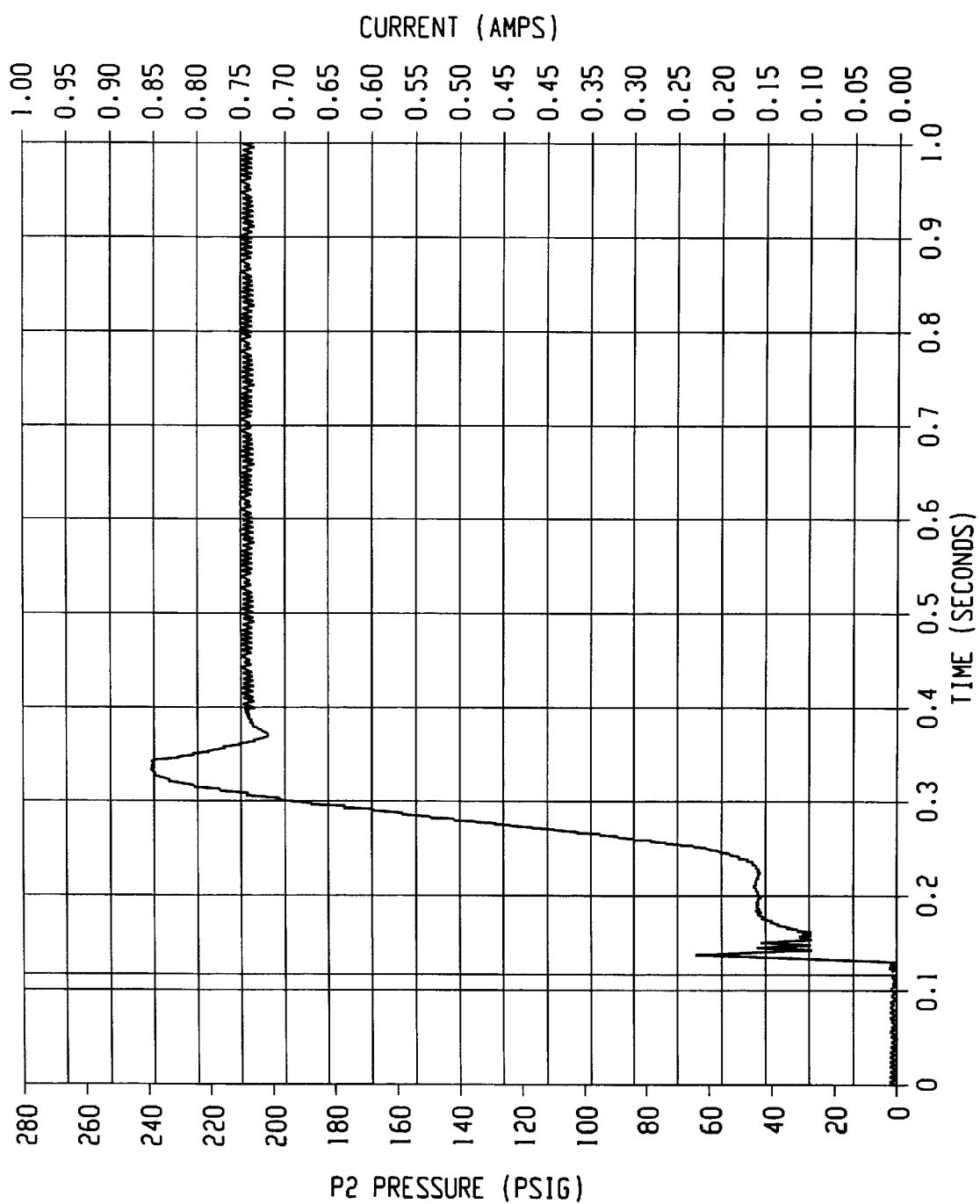
FIG. 5 is a graph of control port pressure and solenoid current as a function of time for the prior art valve of FIG. 4.

Referring to FIG. 5, a pressure trace of control pressure as a function of time is plotted for measurements of the pressure P2 as measured in the control pressure port 28 for a prior art valve as illustrated in FIG. 4. It will be noted that the response of the spool provides substantial transients and the control pressure port at or near the opening of the port 28 and as the spool nears the fully opened position for port 28.

Figure 6:
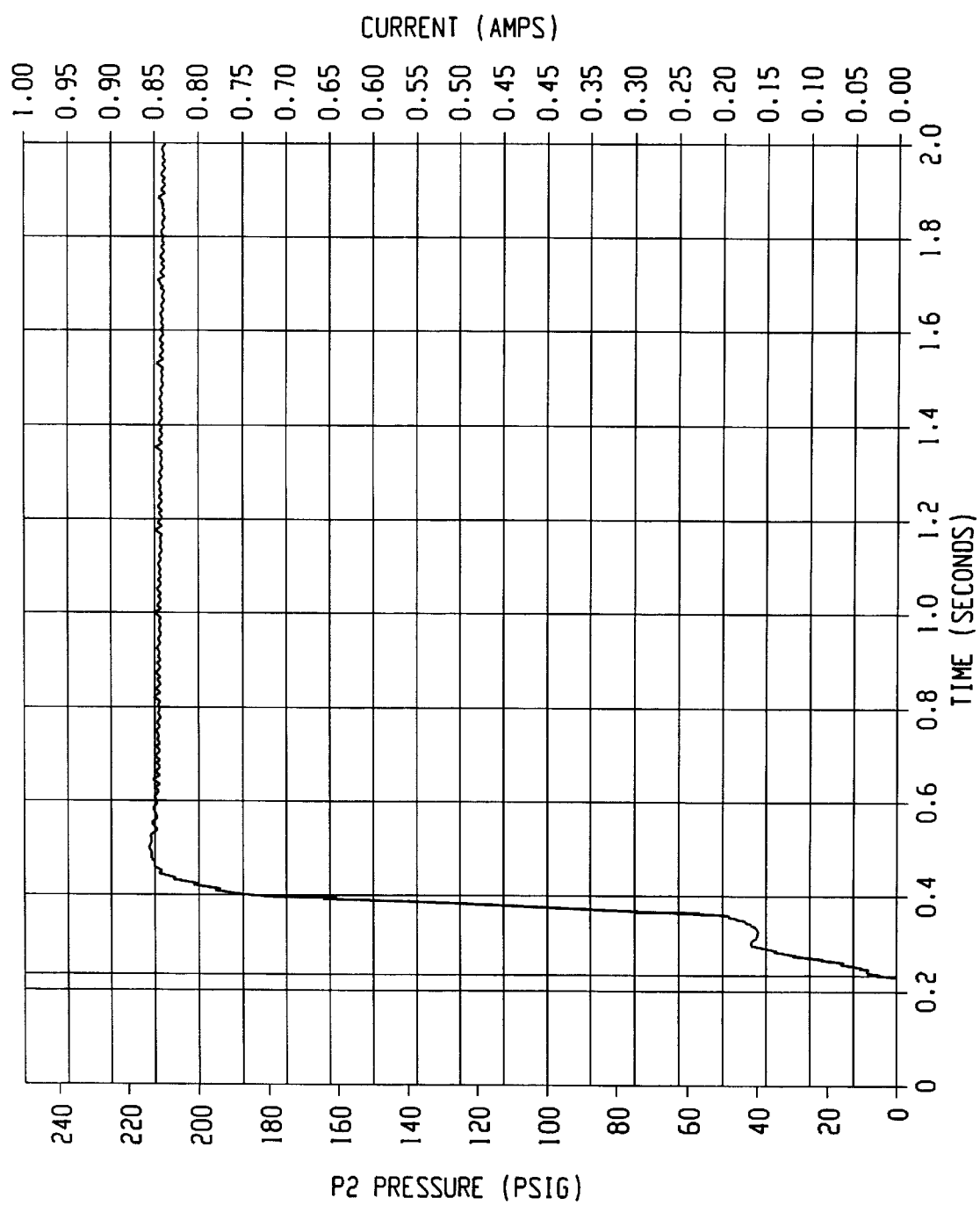
FIG. 6 is a graph of flow versus time similar to FIG. 5 for the valve of the present invention.

Referring to FIG. 6, a pressure trace of control pressure in port 28 as function of time is plotted for the valve of the present invention which shows a smooth transition as the control pressure port opens and as it reaches full steady state flow.

The present invention thus provides a solenoid operated pressure control valve which utilizes a straight spool and spool bore thereby reducing manufacturing costs; and, the control pressure port is connected with the fluid chambers at the spool ends via restricted or metering passages which serve to attenuate or dampen the effects of transients in the hydraulic load circuit to which the control pressure port is adapted to be connected.

Although the invention has hereinabove been described with respect to the illustrated embodiments, it will be understood that the invention is capable of modification and variation and is limited only by the following claims.

What is claimed is:

1. A solenoid operated pressure control valve comprising:
    (a) a valve body having a straight bore therein with an inlet port, an exhaust port, and a control outlet port disposed in axially spaced arrangement in said bore;
    (b) a valve spool disposed in said bore for axial movement therein and having (i) a first annular surface thereon closely fitting said bore and disposed adjacent said inlet port, (ii) a second annular valving surface thereon closely fitting said bore and disposed adjacent said exhaust port and spaced from said first annular valving surface, and (iii) a recessed portion intermediate said first and second annular valving surface, said recessed portion in continuous communication with said pressure control port;
    (c) a first fluid chamber disposed at a first end of spool and a first metering passage formed in said spool communicating said first fluid chamber with said recess;
    (d) a second fluid chamber disposed at a second end of said spool opposite said first end and a second metering passage formed in said spool communicating said second fluid chamber with said recess;
    (e) an elongated member having an end thereof attached to and extending from said first end of said spool, said member having an end opposite said attached end extending through said body externally of said bore in sliding sealed arrangement, said member thereby reducing the surface area of said spool end exposed to pressure in said first fluid chamber; and
    (f) a solenoid disposed to have the armature thereof contacting said externally extending end of said elongated member wherein said solenoid, upon energization is operable to move said spool to increase flow from said inlet to said recess and decrease flow from said recess to said exhaust port.

2. The valve defined in claim 1, wherein said first and second annular valving surfaces comprise annular lands.

3. The valve defined in claim 1, wherein elongated member is press fitted in said end of said spool.

4. The valve defined in claim 1, further comprising a spring biasing said spool in a direction for reducing flow to said recess from said inlet port.

5. The valve defined in claim 1, wherein said first and second metering orifices extend axially through opposite ends of said recess.

6. A method of controlling pressure in a control pressure outlet of a solenoid operated pressure control valve comprising:

(a) forming a straight bore in a valve body and forming separate ports in said bore axially sequentially for supply pressure inlet, control pressure outlet and exhaust;

(b) disposing a spool in closely fitting sliding arrangement in said bore;

(c) forming a first metering land on said spool and disposing said land adjacent said port for supply pressure inlet;

(d) forming a second metering land on said spool and disposing said second metering land adjacent said port for exhaust;

(e) recessing said spool axially intermediate said first and second metering land and disposing said recess in continuous communication with said control pressure port;

(f) closing one end of said bore and forming a first fluid chamber exposed to a first end of said spool;

(g) closing a second end of said bore and forming a second fluid chamber exposed to a second end of said spool opposite said first end;

(h) forming a first metering passage in said spool and communicating said first fluid chamber with said recess via said first metering passage;

(i) forming a second metering passage in said spool and communicating said second chamber with said recess via said second metering passage;

(j) attaching a rod member having a reduced transverse area to one of said first and second ends of said spool and extending said rod member through said respective fluid chamber closed end of said bore and sealing same thereabout;

(k) disposing a solenoid on said body and disposing the armature thereof for operatively contacting said rod member; and (l) energizing said solenoid and moving said spool in a direction causing said first metering land to increase flow from said pressure supply port to said spool recess and causing said second metering land to decrease flow from said spool recess to said exhaust port controlling the pressure in said recess to a desired level according to said energization.

7. The method defined in claim 6, wherein said step of attaching a rod includes press fitting one end of said rod member in one end of said spool.

8. The method defined in claim 7, wherein said step of moving said spool includes overcoming a spring force biasing said spool in a direction causing decreased flow to said recess from said supply pressure port.

\* \* \* \* \*